2,814,610
METHOD OF TREATING TERPENE RESINS

Clinton A. Braidwood and Robert W. Hamre, Schenectady, N. Y., assignors to Schenectady Varnish Company, Inc., Schenectady, N. Y., a corporation of New York No Drawing. Application June 3, 1955,
Serial No. 513,161

33 Claims. (Cl. 260—93.3)

The present invention relates to the purification of terpene resins prepared using metal halides as catalysts.

It is well known that terpenes such as alpha pinene, beta pinene, dipentene, limonene, alpha terpinene, myrcene, allo-ocimene and ocimene and other terpenes of the general formula $C_{10}H_{16}$ can be polymerized alone or in combination with each other. Such polymerization, for example, is disclosed in Thomas patent, 1,939,932, December 19, 1933.

Terpene resins are generally prepared today by polymerizing alpha pinene or beta pinene or mixtures containing these pinenes, e. g., turpentine, with a Friedel-Crafts catalyst such as aluminum chloride, stannic chloride, antimony trichloride, ferric chloride, aluminum bromide, aluminum iodide, boron fluoride and beryllium chloride alone or in combination with each other. Organic complexes of these acid catalysts, e. g., boron trifluoride etherate of these catalysts, which in general give an acid reaction when placed in water, have also been used. The polymeric products range from liquids and low melting point solids to soft solids and finally to hard and brittle, high melting point, e. g., above 80° C., resins which are light amber in color.

For example, alpha or beta pinene or a mixture of these two materials in any ratio, is charged into a vessel and a metal halide, such as aluminum chloride, is added over a period of time during agitation under controlled temperature conditions. Temperatures as high as 200° C., as low as —78° C., have been employed successfully. Although it is not essential it has frequently been found advantageous to carry out the reaction in an inert diluent, e. g., toluene or xylene. The reaction solution containing terpene polymer, inert diluent and spent metal halide, e. g., aluminum chloride, is then washed to remove the catalyst. Generally, the catalyst is removed by repeated washing with dilute hydrochloric acid. The wash water contains 1 to 3% hydrochloric acid which aids in the removal of the metal halide. The dilute hydrochloric acid washes are followed by water washes and sometimes a dilute alkali wash to remove or neutralize the excess hydrochloric acid and aluminum chloride or other metal halide fragments which include hydrolyzed components of the metal halide and metal hydroxide complexes.

Other methods of removing the metal halide catalyst from the reaction solution containing terpene polymer and inert diluent, include treating the polyterpene solution with dilute alkaline reagent to either precipitate or neutralize the metal halide. Then subsequent water washes are employed to remove the component parts of the original metal halide catalyst, and water soluble salts. In some cases the precipitated catalyst can be separated from the terpene polymer solution through a filter medium such as the various filter clays, diatamaceous earth, glass wool, bauxite, etc.

The laborious tasks outlined above of using filtration medium and/or repeated washes with water and/or dilute hydrochloric acid are very costly from an operation standpoint, and, even more important, they never totally remove the metal halide catalyst and its fragments such as metal, halides, metal halides or partially hydrolyzed metal halides.

It is of the utmost importance that the metal halide or its fragments, either metal or halide, be removed as completely as possible in view of the extremely deletrious effect these substances have on the finished polymer whether it is the liquid, or low molecular weight polymer, or the high melting point, hard, high molecular weight form.

A terpene polymer or resin containing significant residual metal halides or fragmentation products thereof such as halides when used to perpare a surface coating or a rubber adhesive will have a shorter shelf or storage life than the same terpene resin or polymer containing only traces of halides or metal halides. Furthermore, when a surface coating or rubber adhesive is prepared using a terpene resin containing significant residual halide or metal halide comes in contact with a metal surface, excessive corrosion takes place at the interface between the coating and the metal surface resulting in adhesion failure or lost protection in regard to the surface coating. When polyterpene resins containing metal halides or their fragments come into contact with textile fabrics, e. g., cellulosic textiles, or wood, the halide attacks the organic fibers, resulting in lost tensile strength.

The ideal terpene resin for a rubber compounder or a surface coating manufacturer would be a resin containing no halide or metal halide. It is well known that hydrogen chloride will embrittle natural rubber and various synthetic rubbers, e. g., GR–S (a rubbery butadiene-styrene copolymer), or even most other unsaturated polymers. In the case of saturated elastomers, discoloration or after-yellowing is noted.

One of the prerequisites of a polyterpene resin for electrical insulation purposes requires the terpene resin not to contain over six parts per million of chloride. Higher halide content causes lost insulation properties and insulation breakdown.

Fragments of metal halides have an immediate effect upon the initial color of the polyterpene resin and even metal halides in low concentration will give poor ageing characteristics and affect the ultimate color retention of the resin if used in light colored formulations. Metal halides contained in terpene polymers even as low as 250 parts per million will damage or shorten the life of pressure sensitive tapes, rubber cements, adhesives, compounded rubber stocks, sealing waxes and surface coatings. When such compounds are in contact with fabrics, e. g., cellulosic fabrics and nylon, metals, and wood, dark staining is noted, the fabrics or wood are decomposed and the metal surfaces corroded. Residual halides in the terpene resins cut down the shelf ageing or the life of pressure sensitive tapes.

Short life is brought about, for example, by the formation of hydrogen chloride which attacks the rubber polymer and further manifests itself through the embrittlement of the rubber or corroding of the metal or wood, cloth, fabric or other organic material to which it has been applied.

It is an object of the present invention to purify terpene polymers, either liquid or solid, in a simple and economical manner.

It is a further object to reduce the numerous washing steps employed in purifying terpene polymers prepared in the presence of a Friedel-Crafts catalyst.

An additional object is to eliminate the filtration step frequently employed in purifying terpene polymers.

A still further object is to prepare terpene polymers of increased purity.

Yet another object is to prepare terpene polymers which can be employed without substantial deleterious effects for electrical insulation purposes, or in pressure sensitive tapes, or in rubber cements, or as adhesives or as compounded in rubber stocks or as surface coatings, e. g., to coat wood or fabrics such as cellulose fabrics or nylon (e. g., polymeric hexamethylene adipamide) or metals, e. g. steel.

Still further objects and the entire scope of applicability of the present invention will become apparent from the detailed description given hereinafter; it should be understood however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained and a polyterpene, either liquid or solid, can be substantially freed of metal halide or metal or halide fragment thereof by removing the catalyst fragments from the reaction product, preferably as a solution in an inert diluent after polymerization of the terpene by the use of a sequestering agent.

The term "sequestering agent" is used in its normal sense to define a group of compounds such as described in the Journal of Chemical Education, volume 25, page 482, 1948. Many of these agents are weekly ionized, polybasic acid compounds or hydroxylated, organic carboxylic acids or their alkali metal or ammonium salts. Among the useful substances may be mentioned for instance citric acid, sodium citrate, ammonium citrate, potassium citrate, gluconic acid, sodium gluconate, potassium gluconate, glucono delta lactone, glucono gamma lactone, ethylene diamine tetraacetic acid, and its sodium and potassium and ammonium salts, ethylene diamine triacetic acid and its sodium, potassium and ammonium salts, water-soluble polyphosphate salts, e. g., sodium tetraphosphate. Mixtures of such compounds can be employed. The preferred compounds are hydroxycarboxylic acids and their alkali and ammonium salts. Citric acid and its salts of the above character are especially preferred.

The treatment with the sequestering agent can be applied to any terpene polymer made by polymerization in the presence of a Friedel-Crafts catalyst or any terpene polymer containing inorganic halide, e. g., chloride or bromide impurities.

In prepading the polymer treated by the present process there can be employed any Friedel-Crafts or metal halide catalyst known to polymerize terpenes. Examples of such catalysts include aluminum chloride, aluminum bromide, aluminum iodide, ferric chloride, antimony trichloride, boron fluoride, boron fluoride etherate, stannic chloride, titanium tetrachloride, and beryllium chloride. Any polymerizable terpene or mixture containing such terpenes can be employed. Among such terpenes are alpha pinene, beta pinene dipentene, limonene, alpha terpinene, myrcene, allo-ocimene, and ocimene, $\Delta^3$-carene, etc. Bicyclic terpenes such as the pinenes and $\Delta^3$-carene give especially desirable products. Any natural or artificial mixture of such terpenes can be used including the various turpentines such as turpentine from slash pine (*Pinus caribaea*), long leaf pine (*Pinus palustris*), the Florida sand pine (*Pinus clausa*), *Pinus insignis, Pinus radiata* (a New Zealand pine), Lodgepole pine (*Pinus contorta*, e. g., the leaf and twig oil of this pine), *Pinus ponderosa* (e. g., the leaf and twig oil of this western yellow pine), the Sugar pine, Douglas fir (*Pseudotsuga taxifolia*, or *Pseudotsuga douglasii*), *Pinus longifolia* (an Indian pine which is a good source of $\Delta^3$-carene), *Abies concolor* (e. g., the leaf and twig oil or the bark oil), or any other turpentine. Either gum or wood turpentine can be used, the gum turpentines generally being higher in beta pinene than the corresponding wood turpentines.

The polymerization can be carried out at conventional temperatures, e. g., −78° to 200° C., preferably 60° C. or below and in the presence or absence of inert diluents, e. g., hydrocarbons, such as benzene, toluene, n-hexane, or any one or a mixture of the isomeric xylenes. Preferably a water insoluble diluent or solvent is employed.

The sequestering agent is usually added as a dilute water solution to the polyterpene or more preferably to a solution of the polyterpene which has been previously washed with water and/or dilute acid preferably a hydrogen halide such as hydrochloric acid or hydrobromic acid. These prior washing steps can be omitted if desired but this generally is not as desirable from the economic standpoint. Preferably the dilute solution of the sequestering agent is added after one or two dilute hydrochloric acid water washes which have helped to hydrolyze the metal halide, e. g., aluminum chloride.

If a commercial terpent polymer or resin is treated by the sequestering agent the dilute hydrochloric acid water wash can be dispensed with and the terpene polymer, or more preferably an inert solvent solution of the terpene polymer, can be treated directly with the aqueous solution of sequestering agent as the commercial resins as previously set forth are customarily treated to hydrolyze the metal halide.

In addition, to removing the Friedel-Crafts catalyst and the fragments of such catalyst, e. g., chloride, the sequestering agents also sequester metal salts taken in by the process water, e. g., regular city tap water, and they help to hold many polyvalent metal ions such as those of iron, copper, manganese, calcium and magnesium in solution. These ions may occur in the process water originally used or they may be picked up by the raw materials from metal drums, steel storage tanks, pipelines, and brass and copper valves.

The sequestering agent is generally added as a 1% or less aqueous solution in an amount governed by the amount of metal halides in parts per million desired to be sequestered. When two sequestering agents are added together, there can be used 1% of each agent.

For example, a solution of polymerized terpene in toluene containing aluminum chloride as the metal halide catalyst is first treated with a dilute solution of hydrochloric acid. The solution is heated slightly to reduce the viscosity and is constantly agitated. Adequate time is allowed to hydrolyze the aluminum chloride. Agitation is stopped to allow complete water separation and the water layer containing hydrochloric acid and hydrolyzed aluminum chloride is removed. This washing operation can be repeated using dilute hydrochloric acid if the aluminum chloride is not completely hydrolyzed.

It is at this point that the present process deviates from the conventional purification processes. It has been found that if a dilute solution of a sequestering agent is added after the hydrolysis, it will decrease and in many cases remove substantially in entirety the catalyst and catalytic fragments that repeated straight water washes or repeated dilute hydrochloric acid washes will not do. As previously stated, the sequestering agent can be added during the hydrolysis treatment, but such is not preferred.

Metal halides, such as those previously set forth, present in the terpene polymers are readily reduced by dilute hydrochloric acid washes to approximately 30 to 60 parts per million as halide, but even repeated straight water washes will not appreciably lower this range of halide. However, a water wash containing a sequestering agent at this point in the washing operation will reduce the metal halide and metal content to less than half. Thus, a terpene polymer containing 250, 60, or 30 parts per million of halide, e. g., chloride can be purified to such an extent that the halide is present in an amount of less than 30 parts per million, e. g., less than 20 parts per million, and preferably as little as about 6 or even less parts per million.

The amount of sequestering agent needed per water wash is controlled by the volume of water used and the amount of residual metal or metal halide present in the reacted terpene present in the inert solvent solution. While excessive amounts of sequestering agent can be employed, they are no more effective in removing the metal halides and other impurities than small amounts of sequestering agents properly used to remove metal halides or their fragments, while on the other hand, the use of excessive amounts of sequestering agent is wasteful from the economic standpoint.

The present process for the removal of the metal halides, e. g., aluminum chloride, and their fragment portions will be better understood and its efficiency better appreciated in removing impurities in the terpene polymers from the following examples. In the examples, and throughout the specification and claims, all parts are parts by weight unless otherwise specified.

EXAMPLE 1

2025 grams of beta pinene and 1435 grams of xylene (a commercial mixture of the three isomers with the meta isomer predominating as set forth in the Merck Index, 6th edition) were added to the reaction vessel. To the betal pinene-xylene solution 140 grams of aluminum chloride were gradually added over a period of five hours under controlled temperatures ranging between 30° and 60° C. After the last aluminum chloride was added and no further temperature rise or viscosity increase was noted, the reactant solution was then heated to 80° C. and held there for 30 minutes. At the end of this time, 500 milliliters of 2.5% aqueous hydrochloric acid solution was added. The batch was then reheated to 80° C. with agitation. Agitation was continued at 80° C. for 30 minutes. Agitation was then stopped and the batch containing polymerized beta pinene and the inert xylene diluent, hydrolyzed aluminum chloride and dilute hydrochloric acid was then allowed to settle for complete water separation. The water layer was removed. The xylene layer at this point was divided into two equal portions, A and B.

Portion A was treated in the following manner:

1730 grams of the polymerized beta pinene-xylene solution was further treated with 500 ml. of 1% aqueous hydrochloric acid. The batch was then heated to 80° C. and held there for 15 minutes with continuous agitation. Agitation was stopped and the batch was allowed to settle for complete water separation. The water layer was removed.

An aliquot (460 grams) of the pinene resin solution was distilled to remove the xylene. The resulting beta pinene resin had a melting point of 120° C. (ball and ring). Analysis for residual chloride showed 60 parts per million chloride.

First further treatment of portion A

The remainder of portion A, 1270 grams, containing polymerized beta pinene and xylene was further treated with 30 ml. of 1% aqueous citric acid solution. The batch was heated to 80° C. with agitation and held at 80° C. for 15 minutes at which time agitation was discontinued. The batch was allowed to settle for complete water separation and the water layer removed. An aliquot (450 grams) of the polyterpene was then distilled to recover the xylene and the resulting polyterpene resin had a melting point of 118° C. (ball and ring) and gave a chloride analysis of 18.3 parts per million chloride.

Second further treatment of portion A

The remainder of portion A, 820 grams, containing polymerzied beta pinene and xylene was further treated with 250 ml. of an aqueous solution containing 1% sodium citrate. This mixture was heated to 80° C. with agitation and held at this temperature with continued agitation for 15 minutes. Agitation was stopped. The batch was allowed to settle for complete water separation and the water layer removed. An aliquot (410 grams) of the polyterpene resin solution was then distilled to recover the xylene. The resulting terpene resin had a melting point of 120° C. (ball and ring) and gave a chloride analysis of 12.5 parts per million chloride.

Third further treatment of portion A

The remainder of portion A, 410 grams, containing polymerized beta pinene and xylene was further treated with 150 ml. of 0.1% aqueous citric acid and was heated to 80° C. with continued agitation and held there for 15 minutes, at which time agitation was stopped. The batch was allowed to settle for complete water separation and the water removed. The polyterpene-xylene solution at this point was distilled to recover the xylene. The resulting polyterpene resin made from beta pinene had a melting point of 119° C. (ball and ring) and had a chloride analysis of 6.3 parts per million chloride.

Portion B was treated in the following manner:

Portion B which weighed 1730 grams and contained polymerized beta pinene and xylene was treated with 500 ml. of a 1% aqueous hydrochloric acid solution. The batch was then heated to 80° C. and held there for 15 minutes with agitation. Agitation was stopped and the batch allowed to settle for complete water separation and the water layer removed. An aliquot of 460 grams of the polymerized beta pinene-xylene solution was then distilled to remove the xylene and the resulting resin had a melting point of 117° C. (ball and ring) and a chloride analysis of 55 parts per million chloride.

The remainder of portion B, now containing 1270 grams of the polymerized beta pinene-xylene solution, was then further treated with 300 ml. of water containing 3 grams of citric acid and 3 grams of sodium citrate. The batch was heated to 80° C. during continued agitation and held at 80° C. for 15 minutes, at which time agitation was stopped. The batch was then allowed to settle for complete water separation, the water layer removed and the terpene resin-xylene solution distilled to recover the xylene. The resulting resin had a melting point of 120° C. (ball and ring) and a chloride analysis of less than 6 parts per million chloride.

The work with portion B shows that the mixture of citric acid and sodium citrate was superior to the use of either of these materials alone. Thus, by using 3 grams of citric acid and 3 grams of sodium citrate in a one step purification, there resulted a product of better purity than that obtained by using 8 parts of citric acid and 3 parts of sodium citrate in the three step procedure used with portion A. This is indeed surprising as generally it would be expected that a three step purification would be superior to a one step purification using the same reagents.

EXAMPLE 2

A commercial polyterpene resin (chiefly polymerized beta pinene with some alpha pinene) having a melting point of 116° C. (ball and ring) and a chloride content of 45 parts per million, was treated by the present sequestering method. 600 grams of the commercial polyterpene resin was cold cut in 400 grams of a halide free xylene (commercial mixture as in Example 1). This resin solution was then treated with 250 ml. of a 1% citric acid solution and heated to 80° C. Agitation was continued at 80° C. for 15 minutes, at which time agitation was stopped and the batch was allowed to settle for complete water separation. The water layer was removed and the organic layer distilled to recover the xylene. The resulting treated resin had a melting point of about 116° C. (ball and ring) and a chloride content of 22 parts per million.

EXAMPLE 3

Another commercial polyterpene resin (chiefly beta pinene with a minor amount of alpha pinene) having a melting point of 116° C. (ball and ring) and a chloride content of 45 parts per million and 0.022% ash, was treated by the present sequestering method. 600 grams of the commercial polyterpene resin was cold cut in 400 grams of the same halide free xylene used in Example 2. This resin solution was then treated with 250 ml. of a 1% sodium citrate solution, heated to 80° C. with agitation and the agitation continued at 80° C. for 15 minutes, at which time agitation was stopped and the batch allowed to settle for complete water separation. The water layer was removed. The organic layer was distilled to recover the xylene. The resulting treated resin had a melting point of approximately 116° C. (ball and ring) and had a halide content of 6.4 parts per million and 0.000 ash. (The ash content was so low that it was not measurable.)

We claim:

1. A process of purifying a terpene polymer containing halide impurities which comprises contacting said terpene polymer with a sequestering agent selected from the group consisting of hydroxy carboxylic acids, lactones of hydroxy carboxylic acids, salts of hydroxy carboxylic acids, polybasic acids and salts of polybasic acids and separating the polymer from the sequestering agent.

2. A process of purifying a terpene polymer containing halide impurities which comprises contacting said terpene polymer with a sequestering agent selected from the group consisting of hydroxy carboxylic acids, lactones of hydroxy carboxylic acids, salts of hydroxy carboxylic acids, polybasic acids and salts of polybasic acids, said terpene polymer being dissolved in an inert water immiscible solvent and said sequestering agent being added as a dilute aqueous solution and separating the polymer from the sequestering agent.

3. The process of claim 1 wherein the sequestering agent comprises citric acid.

4. The process of claim 1 wherein the sequestering agent comprises a water soluble salt of gluconic acid.

5. The process of claim 1 wherein the sequestering agent comprises an ethylene diamine polyacetic acid.

6. The process of claim 1 wherein a mixture of sequestering agents is employed.

7. The process of claim 6 in which the mixture of sequestering agents includes citric acid and an alkali metal citrate.

8. The process of claim 2 wherein the sequestering agent comprises citric acid.

9. The process of claim 2 wherein the sequestering agent comprises a water soluble salt of gluconic acid.

10. The process of claim 2 wherein the sequestering agent comprises an ethylene diamine polyacetic acid.

11. A process of purifying a beta pinene polymer containing halide impurities comprising contacting said beta pinene polymer with a sequestering agent selected from the group consisting of hydroxy carboxylic acids, lactones of hydroxy carboxylic acids, salts of hydroxy carboxylic acids, polybasic acids and salts of polybasic acids and separating the polymer from the sequestering agent.

12. The process of claim 11 wherein the sequestering agent comprises citric acid.

13. The process of claim 11 wherein the sequestering agent comprises a water soluble salt of gluconic acid, its alkali metal and ammonium salts and the glucono lactones.

14. The process of claim 11 wherein the sequestering agent comprises an ethylene diamine polyacetic acid.

15. A process of preparing a pure terpene resin comprising polymerizing a terpene in the presence of a Friedel-Crafts catalyst, hydrolyzing the catalyst after the polymerization and then contacting the resin with a sequestering agent selected from the group consisting of hydroxy carboxylic acids, lactones of hydroxy carboxylic acids, salts of hydroxy carboxylic acids, polybasic acids and salts of polybasic acids to reduce the metal and halide content of the polymer and separating the polymer from the sequestering agent.

16. A process according to claim 15 in which the catalyst is aluminum chloride.

17. A process according to claim 16 in which the terpene polymer includes polymerized beta pinene.

18. A process according to claim 15 in which the terpene polymer includes polymerized beta pinene.

19. A process according to claim 15 in which the sequestering agent comprises hydroxy carboxylic acid.

20. A process according to claim 19 in which the catalyst is aluminum chloride and the terpene is beta pinene.

21. A process according to claim 1 wherein the sequestering agent comprises a water soluble salt of citric acid.

22. A process according to claim 21 wherein the water soluble salt is an alkali metal salt.

23. A process according to claim 22 wherein the alkali metal salt is a sodium salt.

24. A process according to claim 1 wherein the sequestering agent comprises sodium gluconate.

25. A process according to claim 2 wherein the sequestering agent comprises a water soluble salt of citric acid.

26. A process according to claim 25 wherein the water soluble salt of citric acid is sodium citrate.

27. A process according to claim 11 wherein the sequestering agent is a water soluble salt of citric acid.

28. A process according to claim 27 wherein the water soluble salt is sodium citrate.

29. A process according to claim 15 wherein the sequestering agent comprises citric acid.

30. A process according to claim 15 wherein the sequestering agent comprises sodium citrate.

31. A process according to claim 1 wherein the sequestering agent is ethylene diamine tetra acetic acid.

32. A process according to claim 2 wherein the sequestering agent is ethylene diamine tetra acetic acid.

33. A process according to claim 11 wherein the sequestering agent is ethylene diamine tetra acetic acid.

References Cited in the file of this patent

UNITED STATES PATENTS

| | | |
|---|---|---|
| 2,555,221 | Burroughs | May 29, 1951 |
| 2,555,255 | Suhanin | May 29, 1951 |
| 2,560,744 | Rhines | July 17, 1951 |
| 2,667,522 | McElray | Jan. 26, 1954 |
| 2,669,549 | Darby | Feb. 16, 1954 |

OTHER REFERENCES

C. & E. News, 26, page 3445 (Nov. 15, 1948).